United States Patent [19]

Anderson

[11] Patent Number: 5,123,567
[45] Date of Patent: Jun. 23, 1992

[54] FRUIT HOPPER FOR SINGLE HEAD JUICE EXTRACTOR

[75] Inventor: David N. Anderson, Lakeland, Fla.

[73] Assignee: FMC Corporation, Chicago, Ill.

[21] Appl. No.: 725,386

[22] Filed: Jun. 28, 1991

Related U.S. Application Data

[63] Continuation of Ser. No. 264,572, Oct. 31, 1988, abandoned.

[51] Int. Cl.⁵ .................................................. B65G 61/00
[52] U.S. Cl. .................................... 221/202; 221/192; 221/254
[58] Field of Search ............... 222/243, 244; 221/192, 221/200, 202, 254

[56] References Cited

U.S. PATENT DOCUMENTS

| | | | |
|---|---|---|---|
| 699,670 | 5/1902 | Dutemple | 221/200 |
| 1,610,001 | 12/1926 | Foster | 221/202 |
| 1,657,694 | 1/1928 | Parker | 221/200 |
| 2,572,286 | 10/1951 | Smith . | |
| 3,058,616 | 10/1962 | Loveland et al. | 221/254 |
| 3,058,618 | 10/1962 | Loveland et al. | 221/254 |
| 3,101,831 | 8/1963 | Gaddini | 221/254 |
| 3,119,520 | 1/1964 | Christopher | 221/202 |
| 3,938,701 | 2/1976 | Jones | 221/202 |
| 4,700,620 | 10/1987 | Cross . | |

FOREIGN PATENT DOCUMENTS

| | | | |
|---|---|---|---|
| 139343 | 12/1948 | Australia | 221/192 |
| 0503644 | 6/1979 | Australia . | |
| 526652 | 1/1983 | Australia . | |
| 247541 | 6/1966 | Fed. Rep. of Germany . | |
| 2131770 | 6/1984 | United Kingdom | 221/202 |
| 2187724 | 9/1987 | United Kingdom | 221/254 |
| 83/03953 | 11/1983 | World Int. Prop. O. . | |

Primary Examiner—H. Grant Skaggs
Attorney, Agent, or Firm—Douglas W. Rudy; Richard B. Megley

[57] ABSTRACT

A fruit bin is provide with a perforated floor or bottom allowing at least a single vertical, movable wall that is mounted to move in and out of said perforation into a fruit storage bin. The movable wall is mounted to a feed metering device that serves a dual function of also metering fruit to a fruit processing machine such as a fruit juicer.

5 Claims, 2 Drawing Sheets

FIG_1
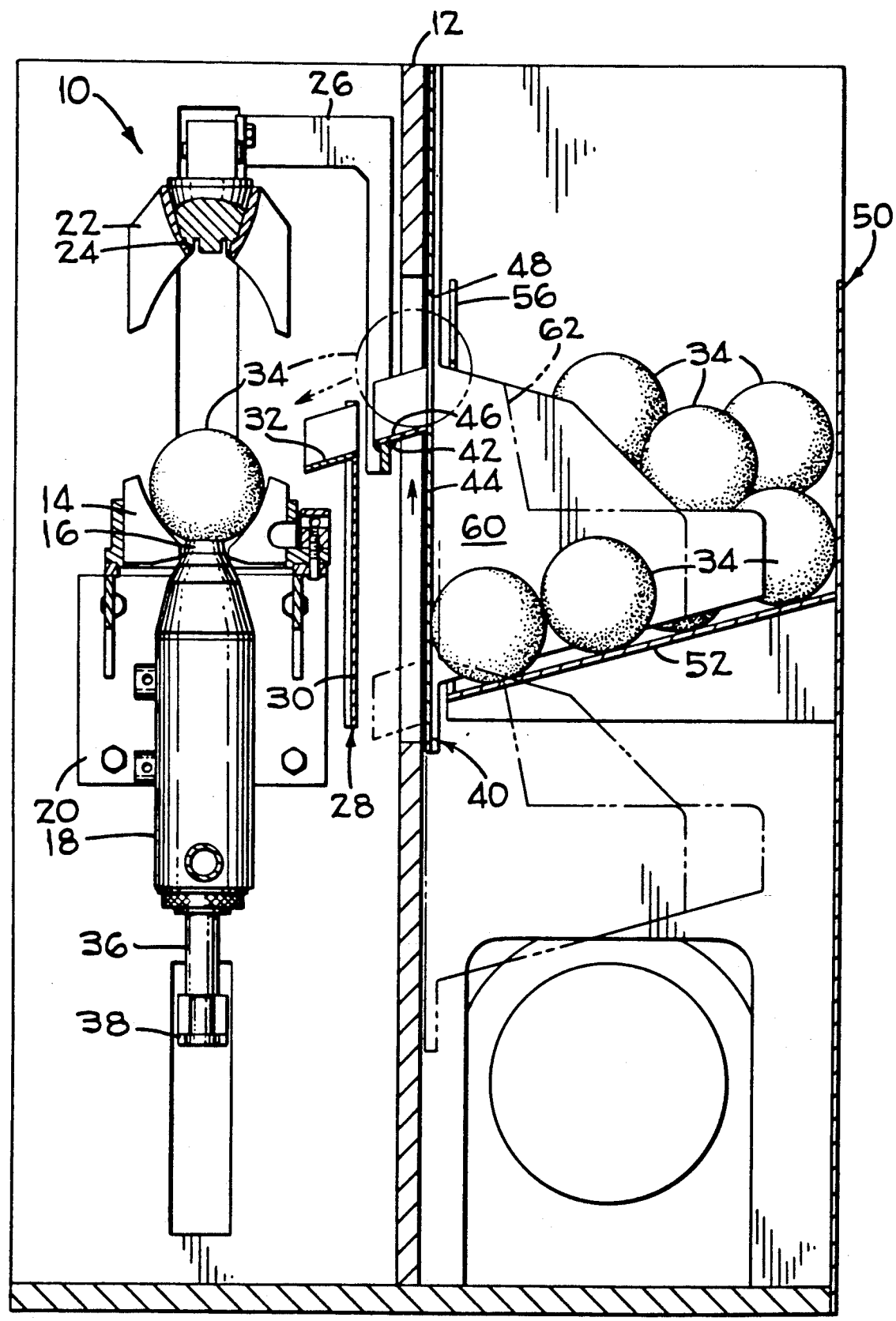

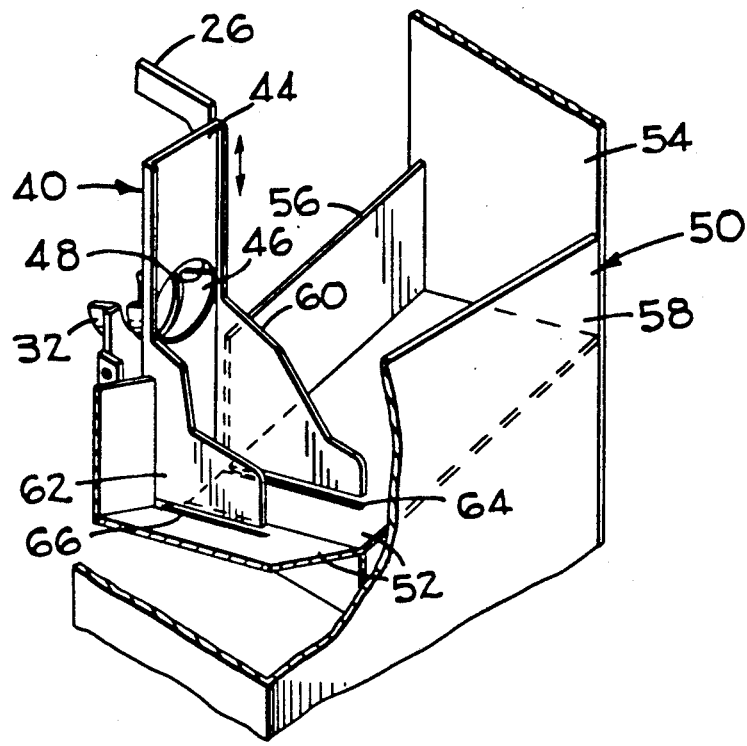
FIG_2
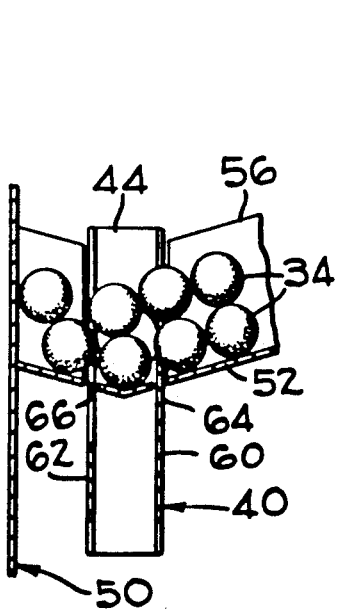
FIG_3
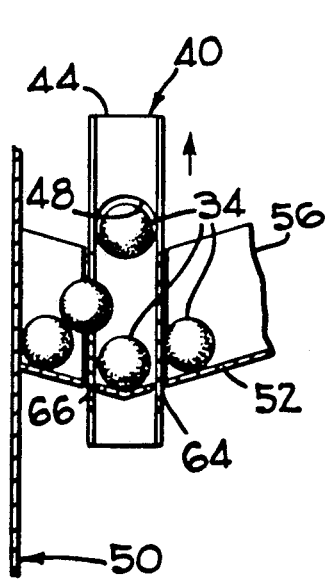
FIG_4
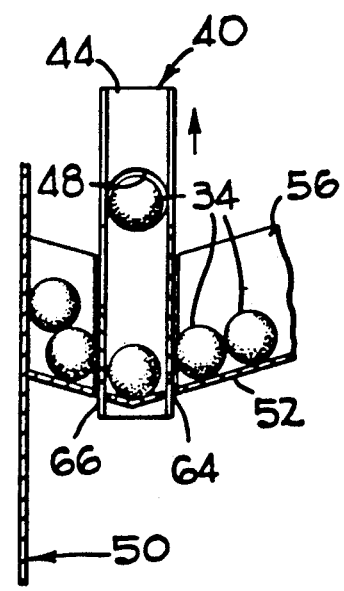
FIG_5

FRUIT HOPPER FOR SINGLE HEAD JUICE EXTRACTOR

This application is a continuation application of U.S. Ser. No. 07/264,572 filed Oct. 31, 1988, now abandoned.

BACKGROUND OF THE INVENTION

1. Field of the Invention

This invention has to do with fruit juice extraction equipment and more specifically with a fruit storage bin that is proximate to and connected to such a fruit juice extraction device. The device is configured to store fruit in a manner that allows gravity feed from the bottom of the bin onto a fruit elevator that elevates the fruit for subsequent gravity feed to the fruit juice extraction equipment. As the fruit is being elevated the device of this invention also causes at least a single wall portion or multiple wall portions to be moved vertically through the fruit storage bin to "tumble" the fruit stored in the bin and thereby prevent "bridging" of the fruit in the fruit storage bin.

2. Summary of the Invention

A fruit storage bin has a two panel angled floor bottom that is surrounded by four bin walls that provide an open container for the storage of fruit such as oranges, grapefruit, lemons, limes, etc. prior to the fruit being processed through a fruit juice extractor. The fruit storage bin is provided with mechanism that assists in the removal of fruit from the bin by preventing "bridging" of fruit in the bin.

The mechanism for preventing bridging comprises a pair of generally vertical wall elements that are positioned over slots or perforations in the floor of the fruit bin. The vertical wall elements are mounted for reciprocal movement to, in a preferred embodiment of this invention, a vertically moving fruit elevator that is provided to elevate fruit into a fruit juice extractor. The vertical wall elements have dissimilar shapes that promote the jostling of fruit in the fruit storage bin, again with the intent of eliminating bridging in the fruit storage bin.

BRIEF DESCRIPTION OF THE DRAWING FIGURES

The invention presented herein is shown in the drawing figures in which:

FIG. 1 is a partially sectioned side elevation view of a juice extractor, with portions removed for clarity, that also shows a fruit storage bin and movable components thereof in phantom and solid line depictions;

FIG. 2 is a projected view of of the fruit storage bin with portions broken away for clarity;

FIG. 3 is a front elevation view of of the fruit storage bin with portions broken away to show the movable components in their lowermost position;

FIG. 4 is a front elevation view of the fruit storage bin with portions broken away to show the movable components in an intermediate position;

FIG. 5 is a front elevation view of the fruit storage bin with portions broken away to show the movable components in their uppermost position.

DETAILED DESCRIPTION OF THE INVENTION

The invention is best understood from an understanding of FIGS. 1 and 2 which best show the environment of the invention and the structure of the fruit storage bin.

The single head juice extractor, generally 10, is a device that has been designed to provide fruit juice extraction at point of sale locations such as supermarkets, roadside stands, and restaurants. The juice extractor is generally contained in a frame 12 which provide vertical supports for the extractor components. The extractor components include a lower cup 14, a lower knife 16, a juice manifold 18 which, along with other components not necessary to describe in this application, are supported on mounting flange 20 to the frame 12 of the juice extractor, generally 10.

A upper cup 22, including an upper knife 24 is carried for reciprocal movement on a fruit lift drive arm 26. The fruit lift is reciprocated by a drive means, which is not shown in any of the figures for reasons of simplicity.

Fixedly mounted to the frame 12 is stationary fruit guide 28 which includes a fruit dam section 30 and a fruit chute section 32.

An exemplary fruit 34 is shown in position to be squeezed in the lower fruit cup 14. The fruit juice extraction process includes moving the upper cup 22 downwardly by means of the fruit lift drive arm to compress the fruit between the upper and the lower fruit cups, 22 and 14 respectively, while the orifice tube 36 is reciprocally driven by means of its drive structure 38 into the fruit as the fruit is being "juiced".

As the fruit lift drive arm is moved reciprocally it will also move the fruit lift means 40 along with it. The fruit lift 40 is attached at a fruit lift drive arm attachment point 42 to the fruit lift drive arm 26 and is guided in its reciprocal motion by guide means not shown. The fruit lift also includes a fruit bridge wall 44 that has a large aperture provided therein and fruit bridge 46 attached to the upper area of the fruit lift means 40.

The fruit hopper or fruit bin, generally 50 is basically a rectangular structure having a floor 52 surrounded by end area side walls such as 54, a front bin wall 56 and a bin wall 58. The floor is comprised of floor plates that are angled toward each other on a downward slope of approximately fifteen degrees to meet at a junction. The floor 52 may be fixed, stationary or non-movable as shown in each of the drawing figures. The floor may also be angled downwardly toward the front bin wall 56 at an angle of approximately fifteen degrees. The floor 52 is provided with a pair of slots or perforations. These perforations, a right side perforation 64 and a left side perforation 66, will accommodate the passage of dividers attached to the fruit lift wall 44.

The divider plates, the right side divider plate being 60 and the left side divider plate being 62, are attached to the front of the fruit lift 40, that is, to the fruit lift wall 44 and will move in reciprocal motion with the fruit lift as the fruit lift is cycled up and down with the upper cup 22.

The divider plates are similar in that they extend outwardly from the front wall of the fruit lift into the fruit bin, generally 50. The divider plates, 60 and 62, are positioned proximate the slots 64 and 66 in the bin floor and are free to move through their respective slots 64 and 66.

Each divider plate has an outline shape or perimeter shaft that differs from the other. For instance, in the embodiment shown in FIG. 2 the right side divider 60 has a height at the fruit lift wall the same as the left side divider 62. The right side divider 60 has an upper edge that slopes downwardly at a relatively shallow angle to second segment of the divider wherein the upper edge of the divider slopes down at a more radical angle to a transition point where the upper edge of the divider is relatively horizontal or extends upwardly at an angle of approximately fifteen degrees to match the slope of the floor 52. The bottom edge of the divider plate extends downwardly towards the front bin wall 56 to eventually attach to the fruit lift wall 56. The angle of the bottom edge may be fifteen degrees, horizontal or any other angle that is reasonably desired.

The left side divider 62 will, as stated above, have a silhouette different from the above described right side divider. For instance, progressing outward from the fruit lift wall the top of the left side divider 62 will progress at a shallow downward angle, preferably not the same angle as the angle of the first sloped portion of the right side divider, then into a radically sloped section and finally into another shallow sloped section at the outboard end of the left side divider. The bottom edge of the left side divider is similar to the lower edge of the right side divider in the preferred embodiment shown.

The configuration of the right and left side divider walls are primarily designed to destroy any bridging of fruit in the fruit storage bin. The tumbling action of the fruit as the fruit lift is cycled up and down causes any bridging of the fruit to be broken as the upper edges of the dividers impact on the fruit in the bin. The method of feeding fruit from the bin is as follows.

The fruit bin, generally 50, can be of any size however the fruit bin show in the preferred embodiment of FIGS. 1 and 2 is sized to accommodate one carton of fruit, for instance one carton of oranges. The carton of fruit will be dumped into the fruit bin at a point in the machine cycle when the divider walls are at a low point such that they are substantially below the floor of the fruit bin. FIG. 3 shows this starting position. The oranges, as previously identified as exemplary oranges 34, will roll toward to the junction between the floor plates and also toward the front bin wall 56. To remove only a single orange from the fruit bin the aperture 48 in the fruit lift wall 44 is sized to allow one orange to pass through the fruit wall 44 when the fruit lift in is the lowest displacement of its stroke, slightly lower than the position of the fruit lift position shown in FIG. 3. In order that the single fruit can roll freely into the juice extractor it is necessary to remove as much of the pressure exerted on the orange to be fed as possible. This is done in the instant invention through the facility of the right side and left side dividers, 60 and 62, which will relieve pressure on the orange occupying the lowest section of the floor of th fruit bin. The optimum spacing between the right side and the left side dividers is at least equal to the approximate diameter of the largest of the fruit expected to be processed by the juice extractor. Pressure is relieved from above the orange to be fed as the fruit lift 40 is urged upward responsive to the upper cup being driven upward by the fruit lift drive arm. As the fruit lift is driven upward the attached right and left side divider plates, the upper or top edges thereof, will press against any fruit adjacent the orange that is at the lowest portion of the fruit bin. By pushing these adjacent oranges out of contact with the single orange to be fed the single orange can roll freely through the large aperture 48 in the fruit lift wall 44.

As can best be seen in FIG. 1, once the orange 34 is at least partially through the large aperture the orange will be supported on the fruit bridge 46 and prevented from rolling off the fruit bridge as the fruit lift is being raised by the fruit dam 30 until the orange clears engagement with the fruit dam at the uper end thereof. At this point the orange will be free to roll off the fruit bridge 46 and via the fruit chute to the lower cup 14. The served orange is now ready to be squeezed.

FIG. 4 shows the fruit lift in an intermediate position prior to a position where the orange is discharged to the fruit chute. The full upwardly displaced position is shown in FIG. 5 where it is seen that the next orange to be fed to the fruit extractor has already rolled into position at the lowest portion of the fruit bin floor. From the FIG. 5 position the the fruit lift will cycle downwardly as the orange is being squeezed, refer to FIG. 1. It should be noted that the fruit lift will go all the way to the lowest end of its stroke on every cycle so that the path to the lowest point of the floor of the fruit bin is not obstructed by the upper edges of the right side and left side dividers appended to the fruit lift wall. The FIG. 3 embodiment does not show the right side divider in its lowest position which will obviously below the floor of the fruit bin or at least low enough to allow the oranges to roll to the desired position for the next fruit lift cycle.

It should be pointed out that the contact between the top edges of the left side and the right side dividers on the oranges or the other fruit in the fruit bin as the dividers are cycled upwardly will tumble the fruit on each cycle to prevent or eliminate bridging.

The following claims attempt to reserve for the inventor of this fruit bin with fruit lift concept all rights in the invention to the extent possible under the law. Nuances of design that don't depart from the spirit and broad scope of the invention as claimed are considered to be covered by the following claims.

What is claimed is:

1. A fruit bin for containing fruit and including means for allowing dispensing of said fruit from said fruit bin, said fruit bin having a bin wall and fixed floor portion shaped toward said bin wall, the improvement comprising:

fruit lift means for elevating one of said fruit contained in said fruit bin to an elevation above said floor portion of said fruit bin for dispensing of said fruit, a pair of slots in said floor portion of said fruit bin, and a pair of divider means mounted for reciprocal movement through said pair of slots in said floor portion wherein said pair of divider means move vertically through said pair of slots in said floor portion of said fruit bin as one of said fruit is elevated in said fruit bin.

2. The invention in accordance with claim 1 wherein said divider means have dissimilar perimeter shapes whereby the dissimilar perimeter shapes of said divider means are effective in destroying any bridging of said fruit in said fruit bin due to said dissimilar perimeter shapes of said divider means acting on said fruit in said fruit bin.

3. The invention in accordance with claim 1 wherein said pair of divider means are attached to and move vertically with said fruit lift means.

4. The invention in accordance with claim 1 wherein said fixed floor portion sloped toward said bin wall comprises two fixed floor portions sloping downwardly toward each other.

5. The invention in accordance with claim 1 wherein said means for dispensing said fruit from said fruit bin includes said fruit lift means having an aperture therein, said aperture is generally circular and may allow the passage of said fruit from said fruit bin.

* * * * *